United States Patent [19]

Chretien et al.

[11] 4,036,908

[45] July 19, 1977

[54] PREPARATION OF VARNISHES BASED ON POLYESTER RESIN

[75] Inventors: Gilbert Chretien, Chauny; Gerard Ditacroute, Autreville; Jacques Meyer, Paris, all of France

[73] Assignee: Rhone-Poulenc Industries, Paris, France

[21] Appl. No.: 668,722

[22] Filed: Mar. 19, 1976

[30] Foreign Application Priority Data

Apr. 10, 1975 France .............................. 75.11199

[51] Int. Cl.² ............................................ C08L 67/06
[52] U.S. Cl. .............................. 260/863; 260/75 UA; 260/861; 260/865; 260/866; 260/873
[58] Field of Search ................... 260/75 UA, 863, 861, 260/865

[56] References Cited

U.S. PATENT DOCUMENTS

| 3,642,673 | 2/1972 | Muhleisen | 260/863 X |
|---|---|---|---|
| 3,657,387 | 4/1972 | Stahly et al. | 260/863 X |
| 3,766,129 | 10/1973 | Pesez | 260/863 X |
| 3,804,799 | 4/1974 | Uffner | 260/863 X |
| 3,894,984 | 7/1975 | Demmler et al. | 260/863 X |
| 3,901,953 | 8/1975 | Watanabe et al. | 260/865 |
| 3,914,200 | 10/1975 | Oswitch | 260/863 X |
| 3,957,906 | 5/1976 | Buzbee et al. | 260/75 UA X |

OTHER PUBLICATIONS

Miles et al, *Polymer Technology* (Temple Press, 1965) pp. 68-69, of interest.

*Primary Examiner*—Murray Tillman
*Assistant Examiner*—T. DeBenedictis, Sr.
*Attorney, Agent, or Firm*—McDougall, Hersh & Scott

[57] ABSTRACT

A method of preparing varnishes based on polyester resin, which do not turn green on polymerization. It comprises forming a reducing agent during polycondensation, by reacting a magnesium compound with the reagents present. Applicable chiefly to the furniture industry.

11 Claims, No Drawings

PREPARATION OF VARNISHES BASED ON POLYESTER RESIN

The invention concerns a method of preparing varnishes based on polyester resin which do not turn green on polymerization.

Varnishes based on polyester resin, polymerized in the presence of cobalt compounds provided to accelerate decomposition of the initiation, are known to have a green color after polymerization at ambient temperature. The coloring is due to oxidation of the divalent cobalt into trivalent cobalt by the initiator present. In order to eliminate such coloring, it has been proposed to add reducing agents such as phosphorous acid or esters thereof, lactic acid, formic acid or zinc octoate. However, these substances have the disadvantage of greatly reducing the reactivity of the resin, and it is recommended to counter this by combining the reducing agents with triphenylphosphine, triphenylarsine or triphenylstibine.

The method of the invention avoids these disadvantages and provides a simple method of preparing polyester resins, the reactivity of which is virtually unchanged by the treatment, and which give varnishes which do not turn green on polymerization.

According to the invention, the method comprises preparing a polyester resin which can be copolymerized at ambient temperature by the action of an initiator, by polycondensation of at least one diol with one or more unsaturated polycarboxylic acids or anhydrides, by dissolving the polycondensate formed in a cross-linking vinyl monomer containing at least one inhibitor and by adding a cobalt compound. It is characterized in that a reducing agent is formed in situ during polycondensation by reaction between a magnesium compound and the reagents present.

The magnesium compounds referred to are magnesium, magnesium oxide, magnesium hydroxide and magnesium salts, such as, inter alia, magnesium acetate. These compounds react with the reagents forming the reaction medium for polycondensation. They have to be added to the medium before about 75% by weight of the polycondensate has formed. For reasons of convenience, they are generally introduced at the same time as the reagents, before polycondensation begins. During polycondensation, which is preferably carried out at temperatures from 160° to 230° C, the compounds react to form reducing groups which are part of the chain of the polycondensate. The reducing agent accordingly has no effect on the reactivity of the polyester resin. The quantities of magnesium compounds to be used are from 0.01% to 0.1% of the weight of the reaction mixture. Quantities larger than 0.1% do not bring any further improvement and have the drawback of being prejudicial to the stability of the polycondensate, since they may cause it to solidify in the reactor.

The polycondensate is a conventional product of the preparation of polyester resins which are copolymerizable at ambient temperature. It is obtained in the usual way, by reacting at least one diol with one or more polycarboxylic acids or anhydrides unsaturated at α, β and possibly one or more saturated polycarboxylic acids or anhydrides.

Examples of the diols are: ethylene glycol, propylene glycol, diethylene glycol, triethylene glycol, tetraethylene glycol, neopentylglycol, butene glycols, dipropylene glycol, trimethylpentanediol, trimethylpropanediol, 1,6-hexamethylenediol, hydrogenated bisphenol A and its derivatives.

The diols are used alone or mixed, either with one another or with other polyols, such as glycerol, trimethylolpropane or pentaerythritol.

The carboxylic acids and anhydrides unsaturated at $\alpha,\beta$ are represented more particularly by maleic and itaconic acid and anhydride and fumaric and mesaconic acid.

Examples of the saturated polycarboxylic acids and anhydrides are succinic, methylsuccinic, adipic, sebacic, orthophthalic, tetrahydrophthalic, hexahydrophthalic and trimellitic acid and anhydride and isophthalic acid.

Examples of cross-linking vinyl monomers which can be used are: styrene, α-methylstyrene, chlorine derivatives of styrene, vinyltoluene, divinylbenzene, triallyl cyanurate, lower alkyl acrylates and methacrylates with not more than 6 carbon atoms, butane-1,3-diol dimethacrylate, and vinyl acetate, propionate and pivalate.

The cross-linking vinyl monomer is used in proportions generally accepted for the preparation of copolymerized polyester resins, i.e. 20% to 50% by weight per 80% to 50% by weight of polycondensate.

In order to preserve the solution before copolymerization, one or more polymerization inhibitors are added. These are selected from conventional inhibitors, such as substituted or unsubstituted phenols, e,g, 22'-methylene-4-bis-methyl-6-tertiobutyl phenol, substituted or unsubstituted polyphenols, paratertiobutyl catechol, hydroquinone, the monomethyl or monoethyl ether of hydroquinone, benzoquinone, toluhydroquinone or tertiobutyl-2 hydroquinone. The inhibitors are added in proportions of 20 to 500 ppm by weight of the copolymerizable polyester resin.

Conventional stabilizers for polyester resins may equally be used. Some examples of these are: copper and its salts, such as copper naphthenate, acetylacetate or octoate, in proportions of up to 3 ppm of copper relative to the polyester resin; salts of quaternary ammonium such as, inter alia, trimethylbenzyl ammonium oxalate or maleate, or cetyl dimethylammonium bromide, in proportions of up to 1000 ppm of the polyester resin.

At the time when the polyester resin is used as a varnish, copolymerization of the polycondensate with the cross-linking vinyl monomer is obtained through the presence of at least one agent for initiating polymerization at ambient temperature. This is represented by conventional organic peroxides and hydroperoxides such as hydroperoxides of cumene, cyclohexanone, methylethylketone and methylisobutylketone.

The quantities of initiators used are of the order of 0.5% to 4% by weight relative to the polyester resin. The initiators are put into contact with the polyester resin by any known processes and particularly by the "reactive base" process, that is to say, by applying to the surface to be varnished a solution of initiator in one or more volatile solvents such as ethyl acetate, butyl acetate, benzene or toluene, and drying before applying the varnish.

Decomposition of the initiators is accelerated by the presence of cobalt compounds, which are conventional products used in the preparation of varnishes, such for example as cobalt naphthenate, octoate, octanoate, acetylacetate and acetylacetonate. They are generally employed in solution in butyl phthalate, dioctyl phthalate or white spirit and incorporated in the polyester resin in quantities of 0.01% to 0.2% by weight of cobalt relative to the polyester resin.

When the polyester resin to be obtained needs to be very reactive, it may be advantageous to add to it one or more additional accelerators such as acetoacetic esters, derivatives of cyclopentanone or resorcinol, acetylacetanilide, or thiourea, in quantities of up to 2% by weight relative to the polyester resin.

Apart from the essential constituents it is possible to include known additives in the varnish prepared according to the invention, e.g. paraffin, lubricants, pigments and coloring agents.

The mixture of the various constituents, forming the varnish, copolymerizes rapidly as soon as it is in the presence of the initiator, to give coatings of a pink color.

Varnishes prepared according to the invention are used in the building and more particularly the furniture trade.

Some examples of the invention will now be given for the purpose of illustration, but not of limitation of the invention.

EXAMPLE 1

The following are placed in a reactor:
59 g maleic anhydride
59.2 g phthalic anhydride
38 g propylene glycol
31 g ethylene glycol
0.09 g magnesium oxide The reaction mixture is heated to 230° C to eliminate the water of reaction.

After cooling, 70 parts of polycondensate obtained are dissolved in 30 parts of styrene and the solution is stabilized by adding 70 ppm of hydroquinone.

In order to obtain a varnish, 100 parts of resin are diluted in 20 parts of styrene, to give a solution with a viscosity of 1.2 poise. To this solution there is added 0.1 part of paraffin and 1 part of a solution of cobalt octoate with 6% by weight of metal in dioctyl phthalate.

The varnish obtained is tested for:
stability at 40° C and at ambient temperature, the varnish being kept at these temperatures until it gels;
reactivity, by coating a plywood panel with a layer of reactive base, comprising a solution of 30% by weight of cyclohexanone hydroperoxide in butyl acetate, using 20 g of solution/m², then by applying a layer of varnish at 250 g/m², and by noting the time when gelling commences;
the color of the varnish after polymerization.

The results obtained are set out in Table 1, where they are compared with results obtained with a varnish based on the same polycondensate but without any magnesium oxide.

TABLE 1

| Examples | Stability ambient months | 40° C days | Reactivity minutes | Color |
|---|---|---|---|---|
| Comparative | 3.5 | 25 | 9 | green |
| 1 | 3.5 | 28 | 8 | pink |

The reducing agent, formed in situ during polycondensation, is found to improve the color but to have virtually no effect on the stability and reactivity of the resin.

EXAMPLE 2

Example 1 is repeated, except that in the polycondensation process the 59.2 g of phthalic anhydride is replaced by 44.5 g of phthalic anhydride and 14.5 g of adipic acid. In addition, 1% of acetylacetanilide, 1 ppm of copper in naphthenate form and 1000 ppm of trimethyl benzyl ammonium maleate are added to the polyester resin obtained.

The varnish obtained has the following properties:
stability at ambient temperature: 3 months
stability at 40° C: 1 month
reactivity: 3 mins. 15 secs.
color: pale pink If the same test is carried out except that the magnesium oxide is introduced when 95% of the polycondensate had formed, the color of the varnish will be green.

EXAMPLES 3 to 5

Example 2 is repeated with various proportions of magnesium oxide and with 90 ppm of monotertiobutyl hydroquinone instead of the hydroquinone.

The quantities of magnesium oxide and the results of the stability, reactivity and color tests are summarized in Table 2. The table also gives the results obtained with the same resin not containing any magnesium oxide.

EXAMPLE 6

The following are placed in a reactor:
65 g maleic anhydride
44.5 g phthalic anhydride and
76 g propylene glycol The reaction mixture is heated to 180° C. When the reaction has proceeded for 1 hour, 0.09 g of magnesium oxide is added and the reaction is continued at the same temperature for 4 hours.

70 parts of the polycondensate obtained are dissolved in 30 parts of styrene and the following are added to the solution: 80 ppm of tertiobutyl hydroquinone, 150 ppm of 22′-methylene-4-bis-methyl-6-tertiobutyl phenol, 2 ppm of copper in naphthenate form, 200 ppm of cetyl dimethylammonium bromide and 200 ppm of thiourea.

The varnish, prepared as in Example 1, has the following properties:
stability at ambient temperature: 2 months
stability at 40° C: 20 days
reactivity: 5 mins. 30 secs.
color: pink.

TABLE 2

| Examples | MgO % of reaction mixture | Stability ambient months | 40° C days | Reactivity mins. | secs. | Color |
|---|---|---|---|---|---|---|
| Comparative | 0 | 1 | 10 | 8 | | light green |
| 3 | 0.05 | 3 | 30 | 3, | 15 | pale pink |
| 4 | 0.07 | 3 | 30 | 3, | 15 | pale pink |
| 5 | 0.1 | 2 | 15 | 5 | | pale pink |

We claim:

1. A process for the preparation of a polyester resin varnish comprising subjecting one or more polycarboxylic acids, at least one of which is an ethylenically unsaturated carboxylic acid, and one or more polyols, at least one of which is a diol, to polycondensation reaction, dissolving the polycondensation reaction product in a copolymerizable vinyl monomer, stabilizing the solution by the addition of an inhibitor with the copolymerizable monomer or after addition of monomer to the solution, adding a cobalt compound to the stabilized solution as an accelerator for cross-linking, and introducing a magnesium compound before 75% completion of the polycondensation reaction whereby reducing groups are formed in the polycondensate which avoid a green discoloration by reason of the presence of the cobalt compound.

2. The method of claim 1, in which the magnesium compound is selected from the group consisting of magnesium, magnesium oxide, magnesium hydroxide and magnesium salts.

3. The method of claim 1, in which the magnesium compound is present in an amount within the range of 0.01% to 0.1% by weight of the reaction mixture.

4. The method of claim 1, in which the polyester resin contains 20% to 50% by weight of cross-linking vinyl monomer to 80% to 50% by weight of polycondensate.

5. The method of claim 1, in which the inhibitor is selected from the group consisting of substituted or unsubstituted phenols or polyphenols, paratertiobutylcatechol, and hydroquinone and its derivatives.

6. The method of claim 1 in which the inhibitor is present in an amount within the range of 20 to 500 ppm of the polyester resin.

7. The method of claim 1 in which the polymerization initiator is an organic peroxide or hydroperoxide.

8. The method of claim 7, in which the initiator is employed in an amount within the range of 0.5% to 4% by weight of the polyester resin.

9. The method of claim 1, in which the cobalt compound is selected from the group consisting of a naphthenate, octoate, octanoate, acetylacetate and acetylacetonate.

10. The method of claim 1, in which the cobalt compound is employed in an amount within the range of 0.01% to 0.2% by weight of cobalt relative to the polyester resin.

11. The method of claim 1, which includes stabilizers, additional accelerators and other additives with the polyester resin.

* * * * *